United States Patent
Yan et al.

(10) Patent No.: US 11,447,227 B2
(45) Date of Patent: *Sep. 20, 2022

(54) SELF-RIGHTING AERONAUTICAL VEHICLE AND METHOD OF USE

(71) Applicants: Gaofei Yan, Hallandale, FL (US); James Dees, Hallandale, FL (US)

(72) Inventors: Gaofei Yan, Hallandale, FL (US); James Dees, Hallandale, FL (US)

( * ) Notice: Subject to any disclaimer, the term of this patent is extended or adjusted under 35 U.S.C. 154(b) by 369 days.

This patent is subject to a terminal disclaimer.

(21) Appl. No.: 16/799,799

(22) Filed: Feb. 24, 2020

(65) Prior Publication Data

US 2020/0247522 A1 Aug. 6, 2020

Related U.S. Application Data

(60) Continuation of application No. 16/174,353, filed on Oct. 30, 2018, now Pat. No. 10,569,854, which is a (Continued)

(30) Foreign Application Priority Data

Jul. 23, 2010 (CN) .......................... 201010235257.7

(51) Int. Cl.
*B64C 1/06* (2006.01)
*A63H 33/00* (2006.01)
(Continued)

(52) U.S. Cl.
CPC .............. *B64C 1/061* (2013.01); *A63H 15/06* (2013.01); *A63H 27/12* (2013.01); *A63H 30/04* (2013.01);
(Continued)

(58) Field of Classification Search
CPC .............. B64C 27/02; B64C 2201/024; B64C 2201/108; B64C 2203/00; B64C 27/10;
(Continued)

(56) References Cited

U.S. PATENT DOCUMENTS

| 2,938,298 A | 5/1960 | Stephan |
| 3,019,555 A | 2/1962 | Poticha |

(Continued)

FOREIGN PATENT DOCUMENTS

| CN | 101940845 A | 1/2011 |
| CN | 202896880 U | 4/2013 |

(Continued)

OTHER PUBLICATIONS

Imaze Tech, Ltd,, Copyright 2018, Source: https://imazetech.com/.

*Primary Examiner* — Christopher P Ellis
(74) *Attorney, Agent, or Firm* — Allen D. Hertz, P.A.; Allen D. Hertz

(57) ABSTRACT

An aeronautical vehicle that rights itself from an inverted state to an upright state has a self-righting frame assembly has a protrusion extending upwardly from a central vertical axis. The protrusion provides an initial instability to begin a self-righting process when the aeronautical vehicle is inverted on a surface. A propulsion system, such as rotor driven by a motor can be mounted in a central void of the self-righting frame assembly and oriented to provide a lifting force. A power supply is mounted in the central void of the self-righting frame assembly and operationally connected to the at least one rotor for rotatably powering the rotor. An electronics assembly is also mounted in the central void of the self-righting frame for receiving remote control commands and is communicatively interconnected to the power supply for remotely controlling the aeronautical vehicle to take off, to fly, and to land on a surface.

22 Claims, 16 Drawing Sheets

Related U.S. Application Data division of application No. 15/672,262, filed on Aug. 8, 2017, now Pat. No. 10,112,694, which is a continuation-in-part of application No. 15/257,904, filed on Sep. 6, 2016, now Pat. No. 9,725,158, which is a continuation of application No. 14/977,546, filed on Dec. 21, 2015, now Pat. No. 9,434,462, which is a division of application No. 14/751,104, filed on Jun. 25, 2015, now Pat. No. 9,216,808, which is a division of application No. 14/022,213, filed on Sep. 9, 2013, now Pat. No. 9,067,667, which is a continuation-in-part of application No. 13/096,168, filed on Apr. 28, 2011, now Pat. No. 8,528,854.

(51) Int. Cl.

| | | |
|---|---|---|
| *A63H 27/00* | (2006.01) | |
| *A63H 15/06* | (2006.01) | |
| *B64C 17/00* | (2006.01) | |
| *B64C 1/08* | (2006.01) | |
| *A63H 30/04* | (2006.01) | |
| *B64C 27/10* | (2006.01) | |
| *B64C 1/00* | (2006.01) | |
| *B64C 17/02* | (2006.01) | |
| *B64C 39/02* | (2006.01) | |
| *B64D 47/08* | (2006.01) | |
| *G05D 1/08* | (2006.01) | |
| *B64C 27/20* | (2006.01) | |
| *G05D 1/00* | (2006.01) | |

(52) U.S. Cl.
CPC ............ *A63H 33/005* (2013.01); *B64C 1/00* (2013.01); *B64C 1/08* (2013.01); *B64C 17/00* (2013.01); *B64C 17/02* (2013.01); *B64C 27/10* (2013.01); *B64C 27/20* (2013.01); *B64C 39/024* (2013.01); *B64D 47/08* (2013.01); *G05D 1/0011* (2013.01); *G05D 1/0094* (2013.01); *G05D 1/0858* (2013.01); *B64C 2201/027* (2013.01); *B64C 2201/108* (2013.01); *B64C 2201/146* (2013.01)

(58) Field of Classification Search
CPC ......... B64C 17/08; B64C 17/00; A63H 15/06; A63H 27/12; A63H 34/04
USPC ............................................ 244/17.23; 701/4
See application file for complete search history.

(56) References Cited

U.S. PATENT DOCUMENTS

| | | |
|---|---|---|
| 3,204,891 A | 9/1965 | Cline |
| 3,213,944 A | 10/1965 | Ross et al. |
| 4,065,873 A | 1/1978 | Jones |
| 5,071,383 A | 12/1991 | Kinoshita |
| 5,150,857 A | 9/1992 | Owen et al. |
| 5,645,248 A | 7/1997 | Campbell |
| 6,550,715 B1 | 4/2003 | Reynolds et al. |
| 7,273,195 B1 | 9/2007 | Golliher |
| 8,033,498 B2 | 10/2011 | Blackbum |
| D648,808 S | 11/2011 | Seydoux et al. |
| 8,109,802 B2 | 2/2012 | Chui et al. |
| 8,147,289 B1 | 4/2012 | Lee |
| D659,771 S | 5/2012 | Seydoux et al. |
| 8,528,854 B2 | 9/2013 | Yan |
| 9,061,558 B2 | 6/2015 | Kalantari et al. |
| 9,150,069 B2 | 10/2015 | Kalantari et al. |
| 9,611,032 B2 | 4/2017 | Briod et al. |
| 2006/0121818 A1 | 6/2006 | Lee et al. |
| 2009/0075551 A1 | 3/2009 | Chui |
| 2009/0215355 A1 | 8/2009 | Elson et al. |
| 2010/0120321 A1 | 5/2010 | Rehkemper et al. |
| 2010/0224723 A1 | 9/2010 | Apkarian |
| 2011/0226892 A1 | 9/2011 | Crowther |
| 2014/0034776 A1 | 2/2014 | Hutson |
| 2014/0319266 A1 | 10/2014 | Moschetta |
| 2015/0377405 A1 | 12/2015 | Down |
| 2016/0001875 A1 | 1/2016 | Daler et al. |
| 2016/0280359 A1 | 9/2016 | Semke |
| 2017/0050726 A1 | 2/2017 | Yamada |

FOREIGN PATENT DOCUMENTS

| | | |
|---|---|---|
| EP | 2813428 B1 | 4/2017 |
| EP | 3239048 A1 | 11/2017 |
| EP | 3116780 B1 | 2/2018 |
| EP | 3448752 A1 | 3/2019 |
| FR | 2856378 B1 | 3/2006 |
| FR | 3009711 A1 | 2/2015 |
| GB | 2538827 A | 11/2016 |
| JP | 2010-52713 | 3/2010 |
| KR | 1020180016822 A | 10/2018 |
| WO | WO2004113166 A1 | 12/2004 |
| WO | WO2014198774 A1 | 12/2014 |
| WO | WO2015022455 A1 | 2/2015 |
| WO | WO2015105554 A1 | 7/2015 |
| WO | WO2015135951 A1 | 9/2015 |
| WO | WO2017186967 A1 | 2/2017 |
| WO | WO2017129930 A1 | 8/2017 |
| WO | WO2019048439 A1 | 3/2019 |

SELF-RIGHTING AERONAUTICAL VEHICLE AND METHOD OF USE

CROSS-REFERENCE TO RELATED APPLICATION

This Non-Provisional Utility Patent Application is:
a Continuation Patent Application claiming the benefit of U.S. Non-Provisional patent application Ser. No. 16/174,353, filed on Oct. 30, 2018, scheduled to issue as U.S. Pat. No. 10,569,854 on Feb. 25, 2020,
wherein U.S. Non-Provisional patent application Ser. No. 16/174,353 is a Divisional Patent Application claiming the benefit of U.S. Non-Provisional patent application Ser. No. 15/672,262, filed on Aug. 8, 2017, now issued as U.S. Pat. No. 10,112,694 on Oct. 30, 2018,
wherein U.S. Non-Provisional patent application Ser. No. 15/672,262 is a Continuation-In-Part Application (CIP) claiming the benefit of U.S. Non-Provisional patent application Ser. No. 15/257,904, filed on Sep. 6, 2016, now issued as U.S. Pat. No. 9,216,808 on Aug. 8, 2017,
wherein U.S. Non-Provisional patent application Ser. No. 15/257,904 is a Continuation-In-Part Application (CIP) claiming the benefit of U.S. Non-Provisional patent application Ser. No. 14/977,546, filed on Dec. 21, 2015, now issued as U.S. Pat. No. 9,216,808 on Sep. 6, 2016,
wherein U.S. Non-Provisional patent application Ser. No. 14/977,546 is a Divisional Application claiming the benefit of U.S. Non-Provisional patent application Ser. No. 14/751,104, filed on Jun. 25, 2015, now issued as U.S. Pat. No. 9,216,808 on Dec. 22, 2015,
wherein U.S. Non-Provisional patent application Ser. No. 14/751,104 is a Divisional Application claiming the benefit of U.S. Non-Provisional patent application Ser. No. 14/022,213, filed on Sep. 9, 2013, now issued as U.S. Pat. No. 9,067,667 on Jun. 30, 2015,
wherein U.S. Non-Provisional patent application Ser. No. 14/022,213 is a Continuation-in-Part Application claiming the benefit of U.S. Non-Provisional patent application Ser. No. 13/096,168, filed on Apr. 28, 2011, which issued as U.S. Pat. No. 8,528,854 on Sep. 10, 2013,
wherein U.S. Non-Provisional patent application Ser. No. 13/096,168 claims the benefit of co-pending Chinese Patent Application Serial No. 201010235257.7, filed on Jul. 23, 2010,
all of which are incorporated herein in their entireties.

FIELD OF THE INVENTION

The present disclosure generally relates to apparatuses and methods for a frame and the construction of a frame that rights itself to a single stable orientation. More particularly, the present disclosure relates to an ovate frame that rights itself to an upright orientation regardless of the frame's initial orientation when placed on a surface.

BACKGROUND OF THE INVENTION

Remote controlled (RC) model airplanes have been a favorite of hobbyists for many years. Initially, in the early years of RC aircraft popularity, the radio controls were relatively expensive and required a larger model aircraft to carry the weight of a battery, receiver and the various servos to provide the remote controllability for the model aircraft. These aircraft were typically custom built of lightweight materials, such as balsa wood, by the hobbyist. Consequently, these RC models represented a significant investment of the hobbyist's time, effort, experience, and money. Further, because of this investment, the hobbyist needed a high degree of expertise in flying the model aircraft to conduct safe operations and prevent crashes. In the event of a crash, most models would incur significant structural damage requiring extensive repairs or even total rebuilding of the model. For these reasons, participation in this hobby was self-restricting to the few who could make the required investments of time and money.

As innovations in the electronics industry resulted in smaller and less inexpensive electronics, the cost and size of radio control units were also reduced allowing more hobbyists to be able to afford these items. Further, these advances also result in reductions in weight of the battery, receiver and servos, which benefits could then be realized in smaller and lighter model airframes. This meant that the building of the airframes could become simpler and no longer requiring the degree of modeling expertise previously required. Simplicity of construction and durability of the airframes were further enhanced with the advent of more modern materials, such as synthetic plastics, foams, and composites, such that the airframes could withstand crashes with minimal or even no damage.

These RC models were still based upon the restraints of airplane aerodynamics meaning they still needed a runway for takeoffs and landings. While the length of the required runways (even if only a relatively short grassy strip) vary according to the size of the RC model, the requirement often relegated the flying of these models to designated areas other than a typical back yard. Model helicopters, like the full scale real life aircraft they are based upon, do not require runways and can be operated from small isolated areas. However, a helicopter with a single main rotor requires a tail rotor, whether full scale or model, also requires a tail rotor to counter the rotational in flight moment or torque of the main rotor. Flying a helicopter having a main rotor and a tail rotor requires a level of expertise that is significantly greater than required for a fixed wing aircraft, and therefore limits the number of hobbyists that can enjoy this activity.

The complexity of remotely flying a model helicopter has at least been partially solved by small prefabricated models that are battery operated and employ two main counter-rotating rotors. The counter-rotation of the two rotors results in equal and counteracting moments or torques applied to the vehicle and therefore eliminating one of the complexities of piloting a helicopter-like vertical take-off and landing model. These models typically have another limiting characteristic in that the form factor of the structure and the necessary placement of the rotors above the vehicle structure result in a tendency for the vehicle to be prone to tipping on one or the other side when landing. In the event of this occurring, the vehicle must be righted in order for further operations and thus requires the operator or other individual to walk to the remote location of the vehicle and right it so that the operator can again command the vehicle to take off.

Therefore, a self-righting structural frame and corresponding vertical take-off vehicle design is needed to permit remote operation of a helicopter-like RC model without the need to walk to a landing site to right the vehicle in the event the previous landing results in a vehicle orientation other than upright.

BRIEF SUMMARY OF THE INVENTION

The present disclosure is generally directed to an aeronautical vehicle incorporating a self-righting frame assembly wherein the self-righting frame assembly includes at least two vertically oriented frames defining a central void and having a central vertical axis. At least one horizontally oriented frame is desired and would be affixed to the vertical frames extending about an inner periphery of the vertical frames for maintaining the vertical frames at a fixed spatial relationship. The at least one horizontally oriented frame provides structural support, allowing a reduction in structural rigidity of the vertical frames. It is understood the at least one horizontally oriented frame can be omitted where the vertical frames are sufficiently designed to be structurally sound independent thereof. A weighted mass is mounted within the frame assembly and positioned proximate to a bottom of the frame assembly along the central vertical axis for the purpose of positioning the center of gravity of the frame assembly proximate to the bottom of the frame assembly. At a top of the vertical axis, it is desirous to include a protrusion extending above the vertical frames for providing an initial instability to begin a self-righting process when said frame assembly is inverted. It is understood that the protrusion may be eliminated if the same region on the self-righting frame assembly is design to minimize any supporting surface area to provide maximum instability when placed in an inverted orientation. When the frame assembly is inverted and resting on a horizontal surface, the frame assembly contacts the horizontal surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame and thereby producing a righting moment to return the frame assembly to an upright equilibrium position.

In another aspect, an aeronautical vehicle that rights itself from an inverted state to an upright state has a self-righting frame assembly including a protrusion extending upwardly from a central vertical axis. The protrusion provides an initial instability to begin a self-righting process when the aeronautical vehicle is inverted on a surface. At least one rotor is rotatably mounted in a central void of the self-righting frame assembly and oriented to provide a lifting force. A power supply is mounted in the central void of the self-righting frame assembly and operationally connected to the at least one rotor for rotatably powering the rotor. An electronics assembly is also mounted in the central void of the self-righting frame for receiving remote control commands and is communicatively interconnected to the power supply for remotely controlling the aeronautical vehicle to take off, to fly, and to land on a surface.

In still another aspect, an aeronautical vehicle that rights itself from an inverted state to an upright state has a self-righting frame assembly including at least two vertically oriented intersecting elliptical frames. The frames define a central void and each frame has a vertical minor axis and a horizontal major axis wherein the frames intersect at their respective vertical minor axes. Two horizontally oriented frames are affixed to the vertical frames and extend about an inner periphery of the vertical frames for maintaining the vertical frames at a fixed spatial relationship. A weighted mass is positioned within the frame assembly along the central vertical axis and is affixed proximate to a bottom of the frame assembly for the purpose of positioning a center of gravity of the aeronautical vehicle proximate to a bottom of the frame assembly. At a top of the vertical axis a protrusion, at least a portion of which has a spherical shape, extends above the vertical frames for providing an initial instability to begin a self-righting process when the aeronautical vehicle is inverted on a surface. When the aeronautical vehicle is inverted and resting on a horizontal surface, the frame assembly contacts the horizontal surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame thereby producing a righting moment to return said frame assembly to an upright equilibrium position. At least two rotors are rotatably mounted in the void of the self-righting frame assembly. The two rotors are co-axial along the central axis and counter-rotating one with respect to the other. The rotors are oriented to provide a lifting force, each rotor being substantially coplanar to one of the horizontal frames. A power supply is mounted in the weighted mass and operationally connected to the rotors for rotatably powering the rotors. An electronics assembly is also mounted in the weighted mass for receiving remote control commands and is communicatively interconnected to the power supply for remotely controlling the aeronautical vehicle to take off, to fly, and to land on a surface.

In another aspect, the self-righting aeronautical vehicle can be designed for manned or unmanned applications. The self-righting aeronautical vehicle can be of any reasonable size suited for the target application. The self-righting aeronautical vehicle can be provided in a large scale for transporting one or more persons, cargo, or smaller for applications such as a radio controlled toy.

In another aspect, the vertical and horizontal propulsion devices can be of any known by those skilled in the art. This can include rotary devices, jet propulsion, rocket propulsion, and the like.

In another aspect, the frame can be utilized for any application desiring a self-righting structure. This can include any general vehicle, a construction device, a rolling support, a toy, and the like.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE PRESENT INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
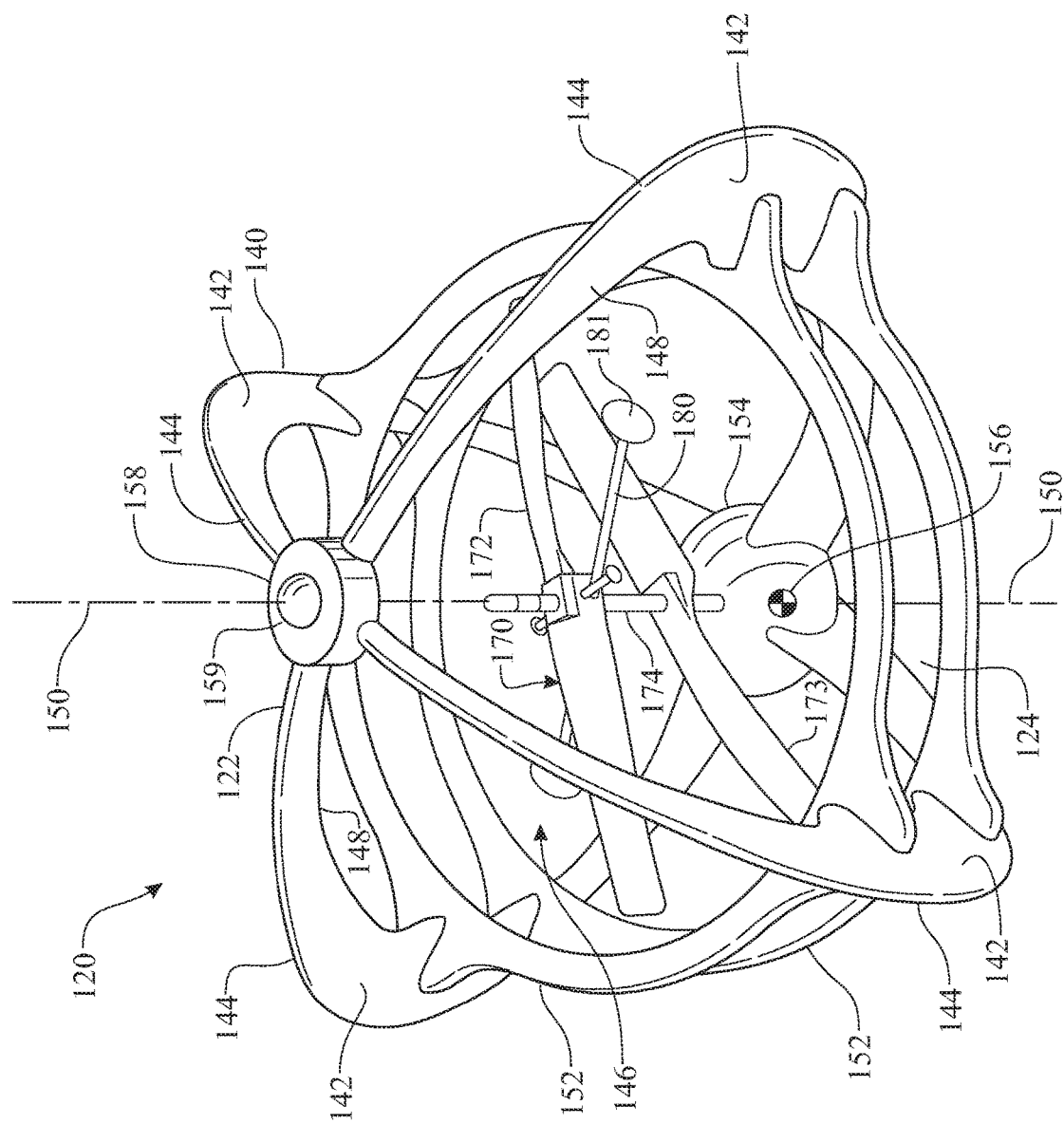
FIG. 1 presents a perspective view of an aeronautical vehicle having a self-righting frame according to the present invention.

Turning to the drawings, FIG. 1 shows a remotely controlled aeronautical vehicle 120 employing a self-righting structural frame 140, which is one of the preferred embodiments of the present invention and illustrates its various components.

Referring now to FIGS. 1-6, aeronautical vehicle 120 and more particularly self-righting frame assembly 140 includes at least two substantially identical vertically oriented frames 142 arranged in an intersecting manner such that the axis of their intersection also defines a central vertical axis 150 of self-righting frame assembly 140. Frames 142 are further oriented one with respect to the other to substantially define equal angles about an outer periphery of self-righting frame 140.

Each frame 142 defines an outer edge 144 having a continuous outer curve about a periphery of frame 142. Frames 142 may have a circular shaped outer curve 144, but in a most preferred embodiment, frames 142 have an elliptical shape wherein the major axis (represented by dimension "a" 186 of FIG. 2) is the horizontal axis of frames 142 and wherein the minor axis (represented by dimension "b" 187 of FIG. 2) is the vertical axis of frames 142 (i.e., dimension "a" 186 is greater than dimension "b" 187). Frames 142 also have an inner edge 148 which, if frames 142 were rotated about axis 150, define a central void 146. A bottom 124 of frames 142 and thus of frame assembly 140 is flattened instead of carrying the elliptical form through to central axis 150. The flattened bottom area 124 of frames 142 contributes to a stable upright equilibrium of frame assembly 140.

At least one horizontal frame 152 extends about an inner periphery of central void 146. In a most preferred embodiment, two horizontal frames 152 extend about the inner periphery of void 146 and are vertically spaced one from the other. Frames 152 are affixed to each frame 142 substantially at inner edges 148 of frames 142 and maintain the plurality of frames 142 at a desired fixed spatial relationship one to the other, i.e. defining substantially equal angles one frame 142 with respect to an adjacent frame 142.

A weighted mass 154 is positioned with frame assembly 140 and affixed thereto in a stationary manner. As illustrated, weighted mass 154 is held captive in a stationary manner proximate to a bottom 124 of the plurality of frames 142 along central vertical axis 150. While one manner of holding weighted mass 154 captive is accomplished by frames 142 conforming to an outer periphery of weighted mass 154, as illustrated, other manners of retaining weighted mass 154 are contemplated such as using mechanical fasteners, bonding agents such as glue or epoxy, or by other known methods of captive retention known in the industry. The preferred position and weight of weighted mass 152 is selected to place the combined center of gravity of aeronautical vehicle 120 as close to the bottom 124 of vehicle 120 as possible and at a preferably within the form factor of weighted mass 154.

Figure 8:
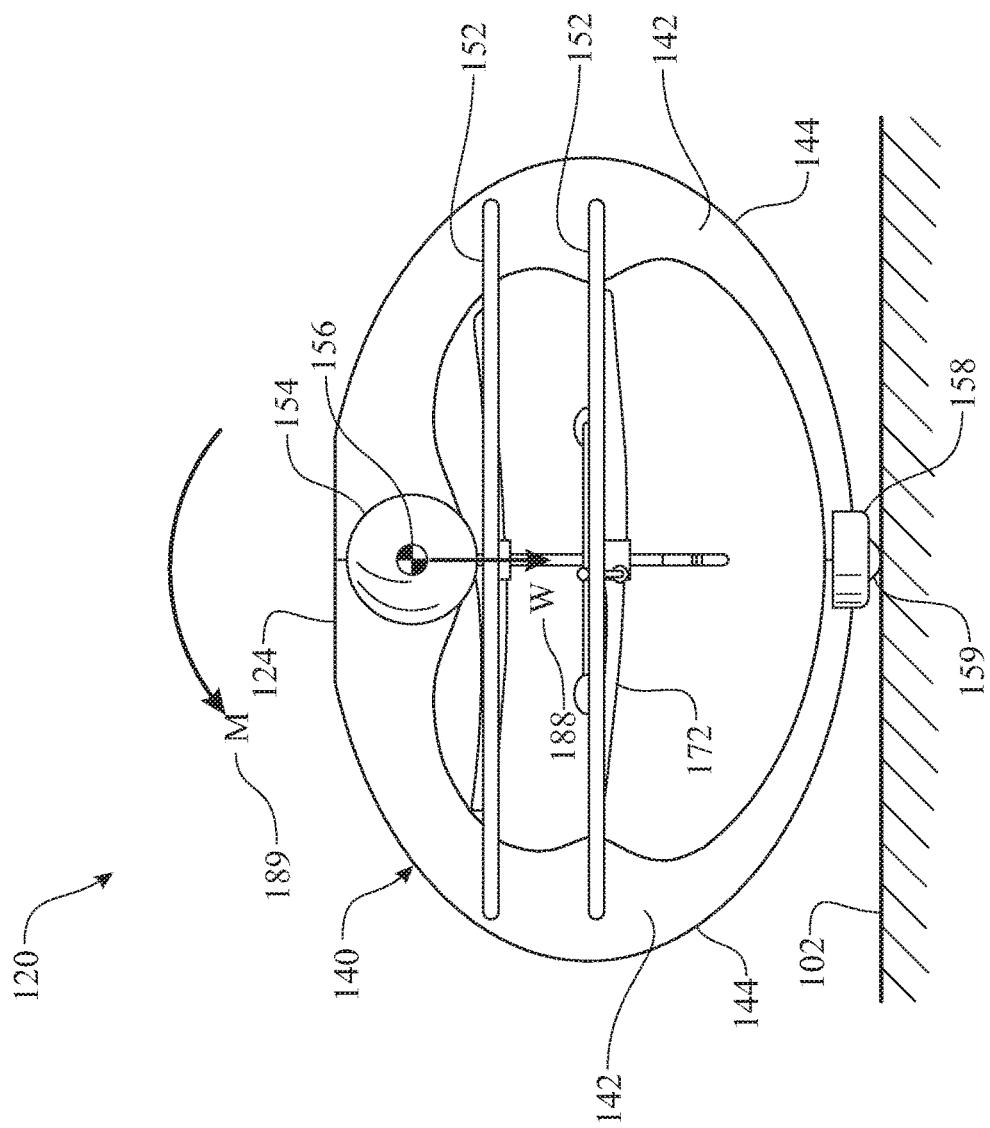
FIG. 8 presents an elevation view of the aeronautical vehicle resting on a surface in an inverted orientation.
Figure 9:
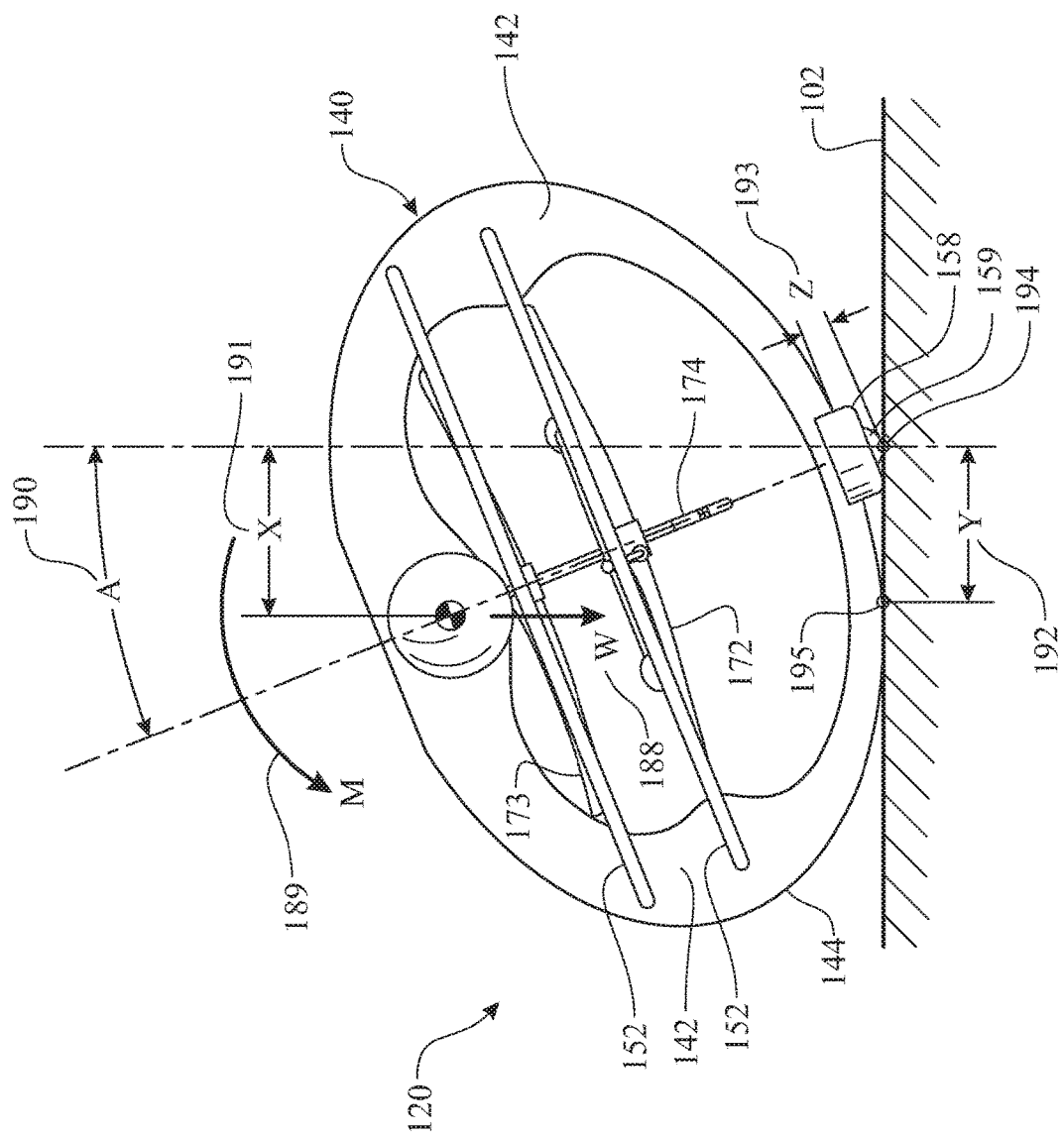
FIG. 9 presents an elevation view of the aeronautical vehicle resting on the surface and beginning the process of self-righting itself.

A protrusion 158 is affixed to a top portion 122 of frame assembly 140. Protrusion 158 extends upwardly and exteriorly from outer edge 144 of frames 142 and in a preferred embodiment an upmost part of protrusion 158 has a spherical portion 160. Those practiced in the art will readily recognize by the disclosures herein that protrusion 158 can be any shape that provides for a single point of contact 194 (FIG. 9) at protrusion 158 with a surface 102 (FIG. 9) when frame assembly 140 is in a substantially inverted orientation on surface 102 (FIGS. 8-9).

Figure 2:
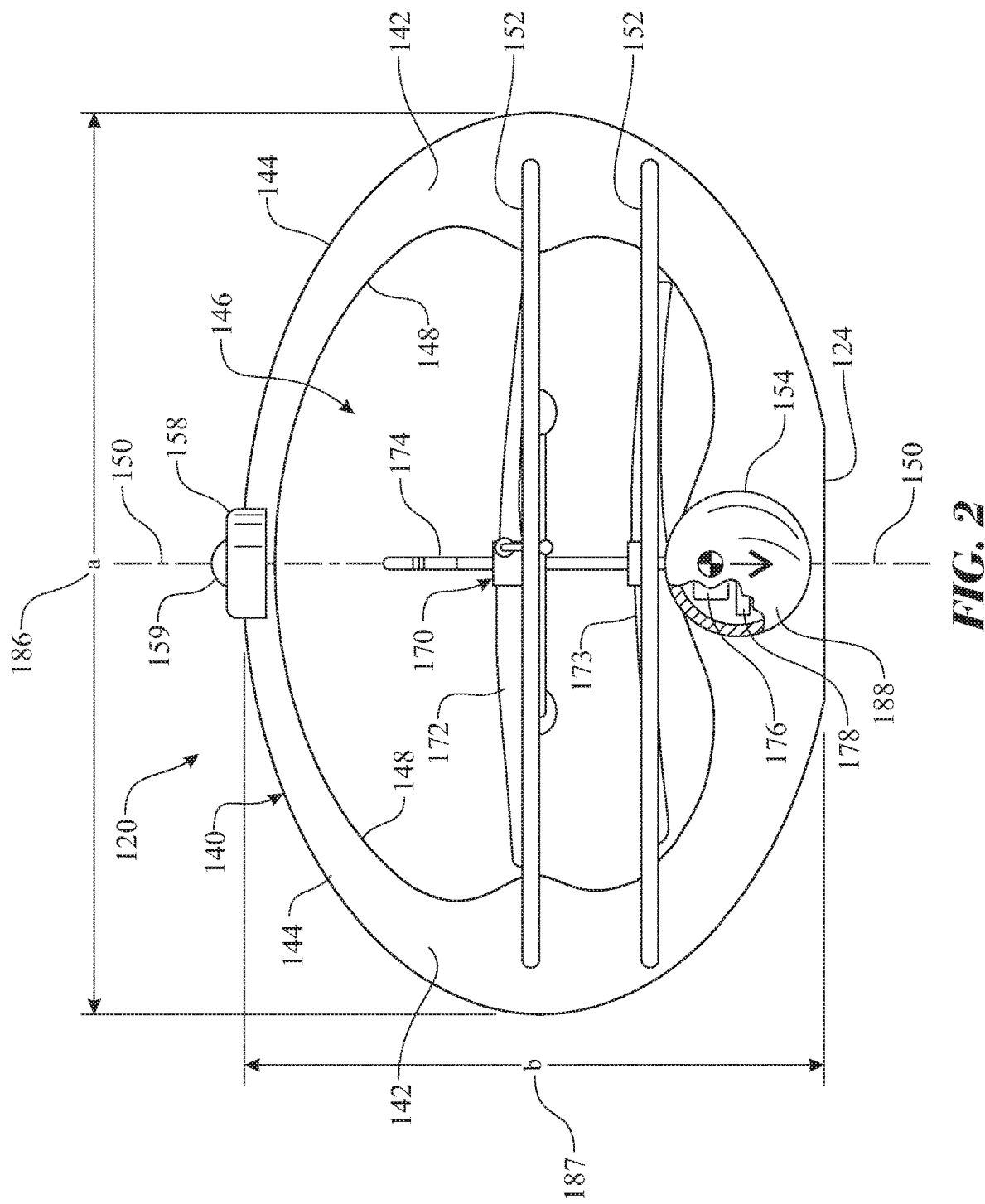
FIG. 2 presents a 45 degree oblique side elevation view of the aeronautical vehicle.
Figure 6:
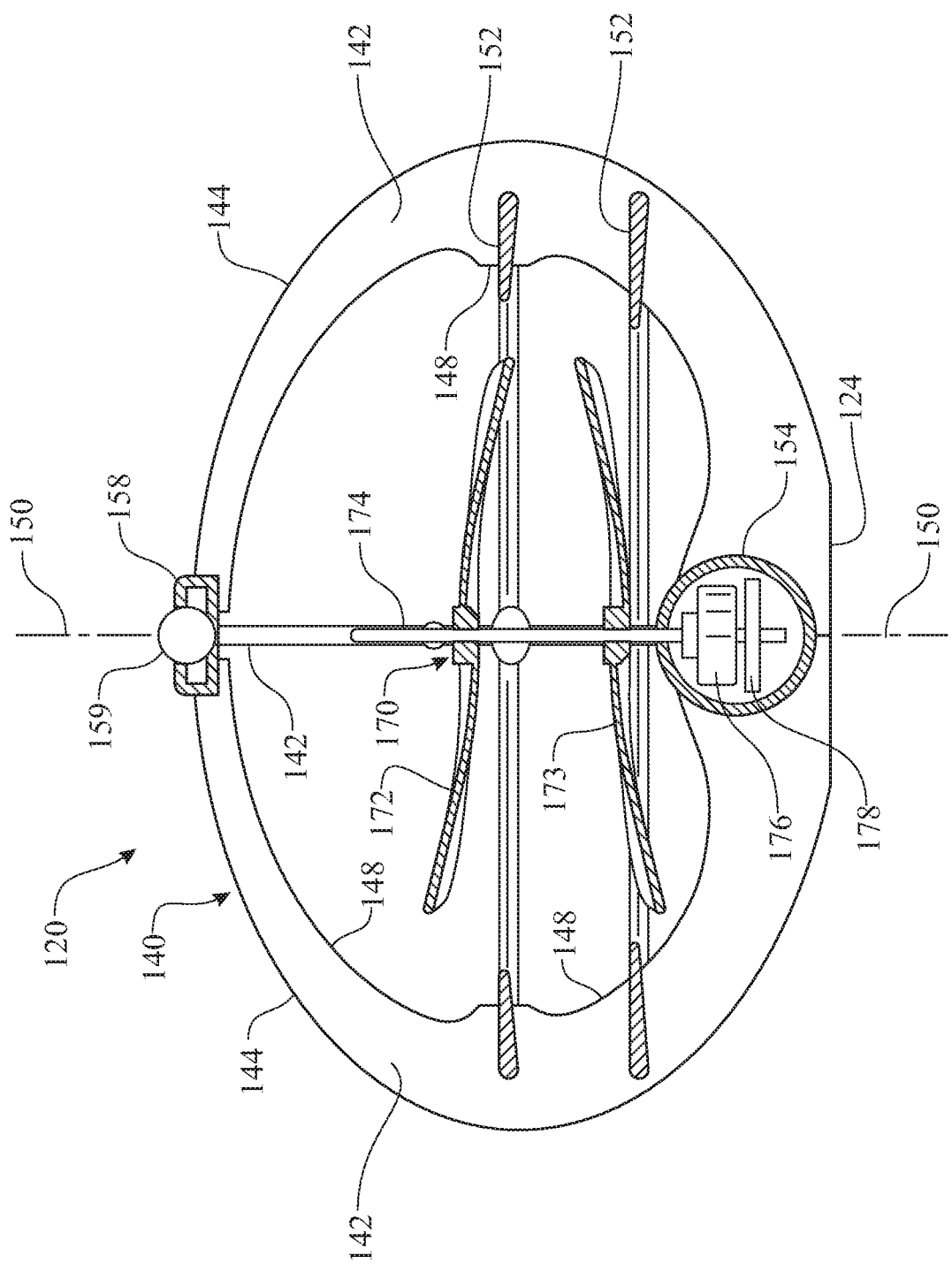
FIG. 6 presents an cross-sectional view of the aeronautical vehicle shown in FIG. 4, taken along the line 6-6 of FIG. 4.

As illustrated in FIGS. 1-6 and particularly in FIGS. 2 and 6, self-righting frame 140 is easily adapted for use in a Vertical Take-Off and Landing (VTOL) aeronautical vehicle 120, here illustrated as a remotely controlled flyable model. Aeronautical vehicle 120 includes self-righting frame assembly 140 and further includes a maneuvering and lift mechanism 170 for providing aeronautical lift and maneuvering of aeronautical vehicle 120 during flight operations. Maneuvering and lift mechanism 170 includes a power supply 176 and remote control electronics 178 for powering and controlling aeronautical vehicle in flight operations. Power supply 176 as illustrated are contemplated to comprise an electrical battery and electric motor, however other power configurations utilized for flyable model aeronautical vehicles are also contemplated. Remote control electronics 178 are capable of receiving remote control radio frequency (RF) signals and translating those signals into control inputs to the power supply 176 for providing directional and velocity controls to aeronautical vehicle 120. Power supply 176 and electronics 178 are further contemplated to be substantially the same as or adapted from like mechanisms utilized for remotely controlled helicopters, but may also be of a unique design for aeronautical vehicle 120 and known to those practiced in the art.

Figure 3:
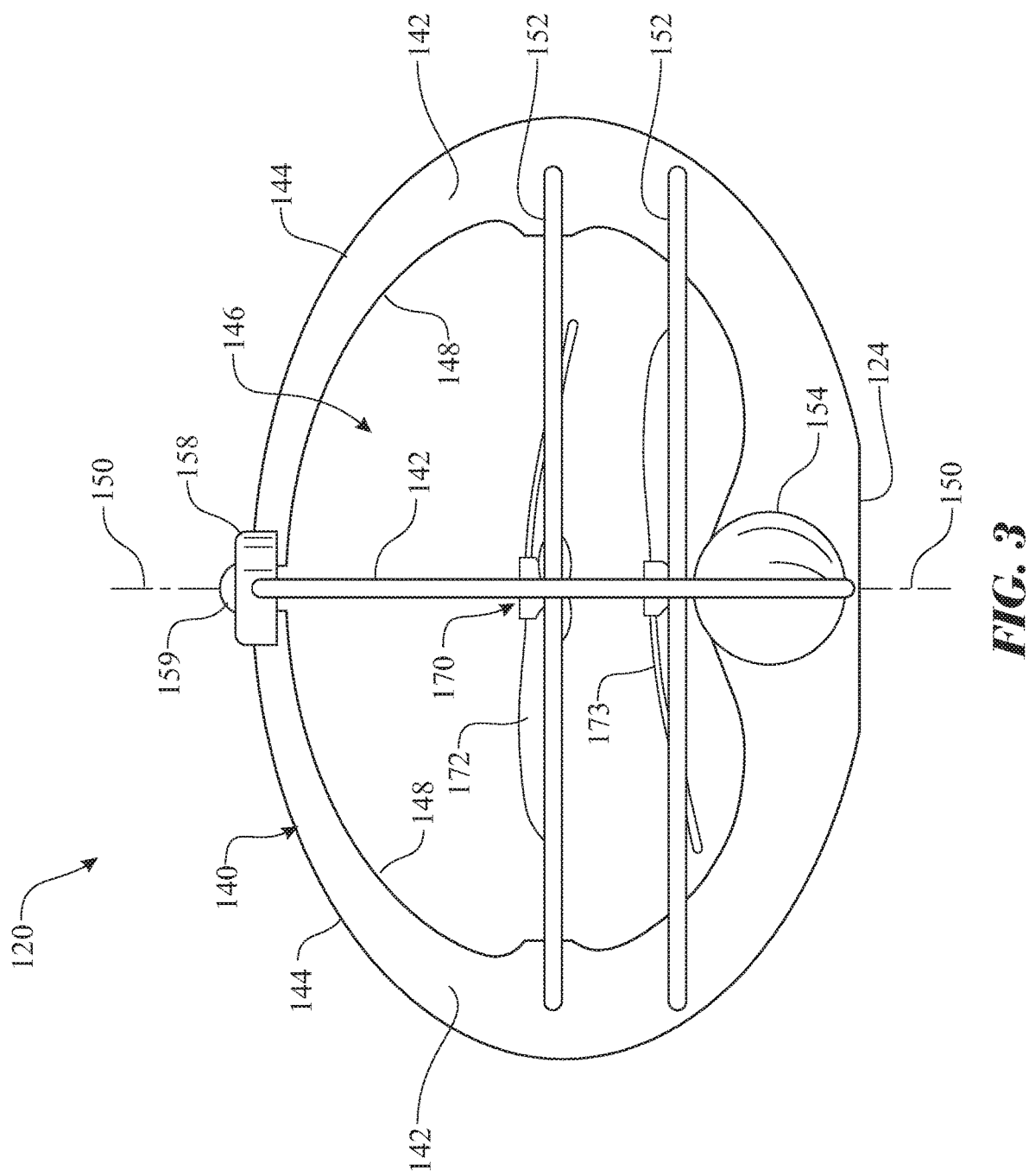
FIG. 3 presents a side elevation view of the aeronautical vehicle.
Figure 4:
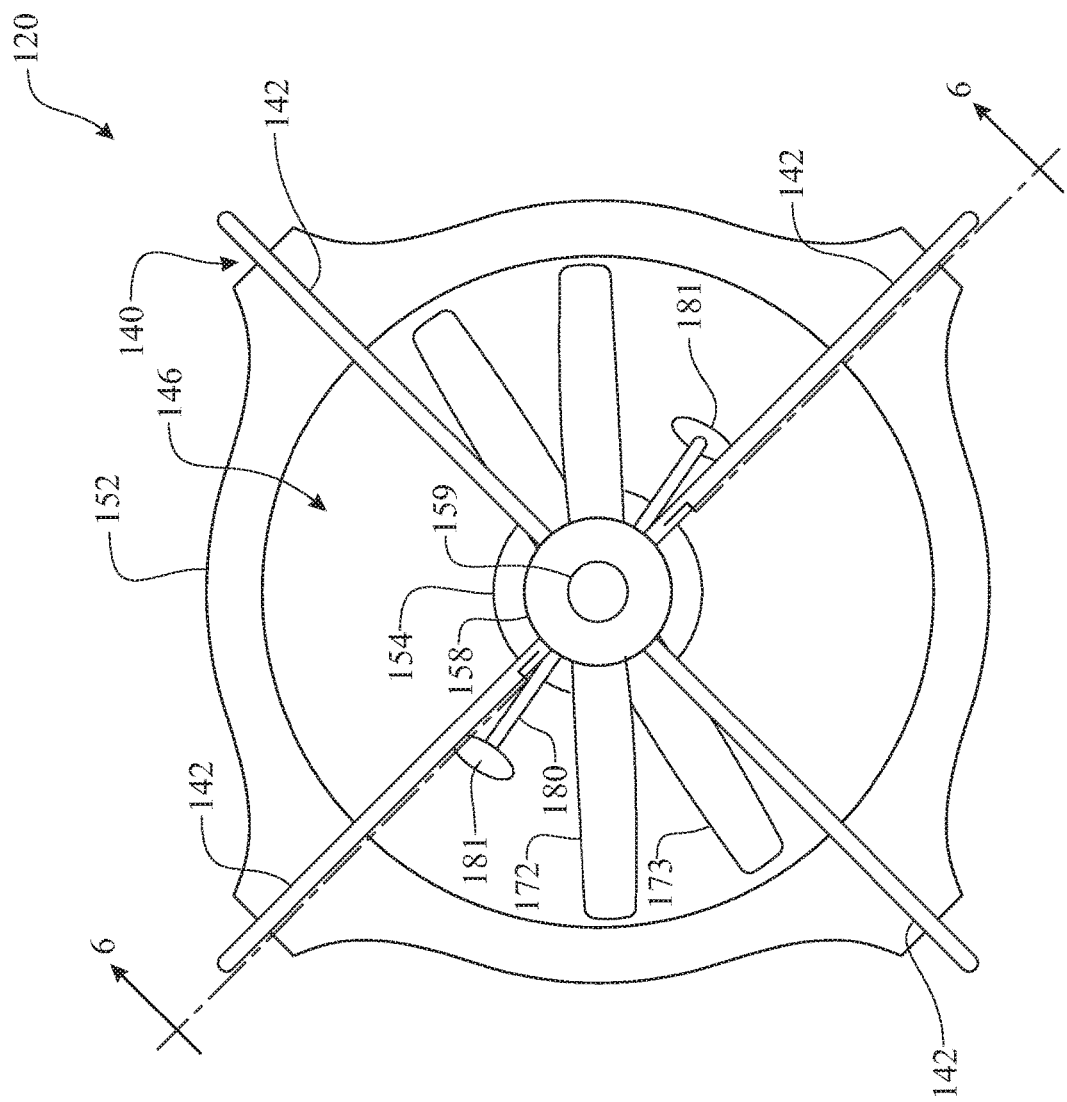
FIG. 4 presents a top plan view of the aeronautical vehicle.
Figure 5:
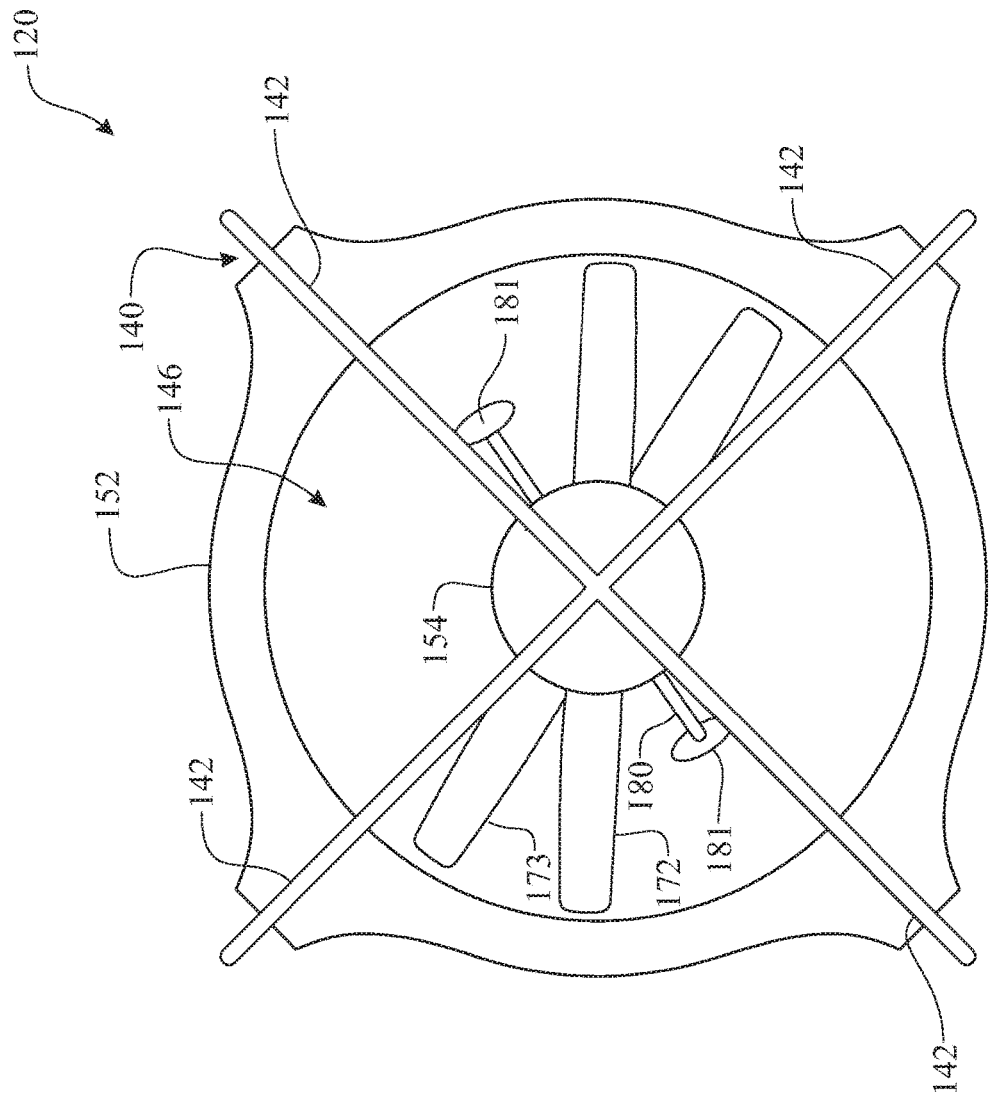
FIG. 5 presents a bottom plan view of the aeronautical vehicle.

Power supply 176 and electronics 178 are preferably housed within and contribute to the function of weighted mass 154 as previously described. A rotating mast 174 is connected to power supply 176 extending upwardly from weighted mass 154 and is coincident with central axis 150. At least one aerodynamic rotor 172 is affixed to mast 174 and when rotated at a sufficient speed functions as a rotating airfoil to provide lift to raise aeronautical vehicle 120 into the air for flying operations. However, as with all aeronautical vehicles employing a rotating aerodynamic rotor to provide lift, aeronautical vehicle 120 also requires an anti-torque mechanism to maintain the rotational stability of self-righting frame assembly 140. A preferred embodiment of aeronautical vehicle 120 includes a second aerodynamic rotor 173 that is also rotatably powered by power supply 176 wherein each rotor 172, 173 is substantially co-planar with a respective horizontal frame 152 as illustrated in FIGS. 2-3. However, rotor 173 is geared to rotate in an opposite direction from rotor 172 and thus countering the torque produced by rotor 172. Such co-axial counter-rotating rotor systems are well known in VTOL design. Other anti-torque systems known in the art and contemplated herein include a single main rotor and a second mechanism such as a smaller rotor at right angles to the main rotor and proximate to a periphery of frame 140 or dual laterally separated counter-rotating rotors.

Maneuvering and lift mechanism 170 can also include a stabilization mechanism comprising a stabilizer bar 180 having weights 181 at opposite ends thereof also rotatably affixed to mast 174 to rotate in conjunction with rotors 172, 173. Stabilizer bar 180 and weights 181 during rotation stay relatively stable in the plane of rotation and thus contribute to the flight stability of aeronautical vehicle 120. Bar 180 and weights 191 are of a configuration known in the helicopter design art.

Figure 7:
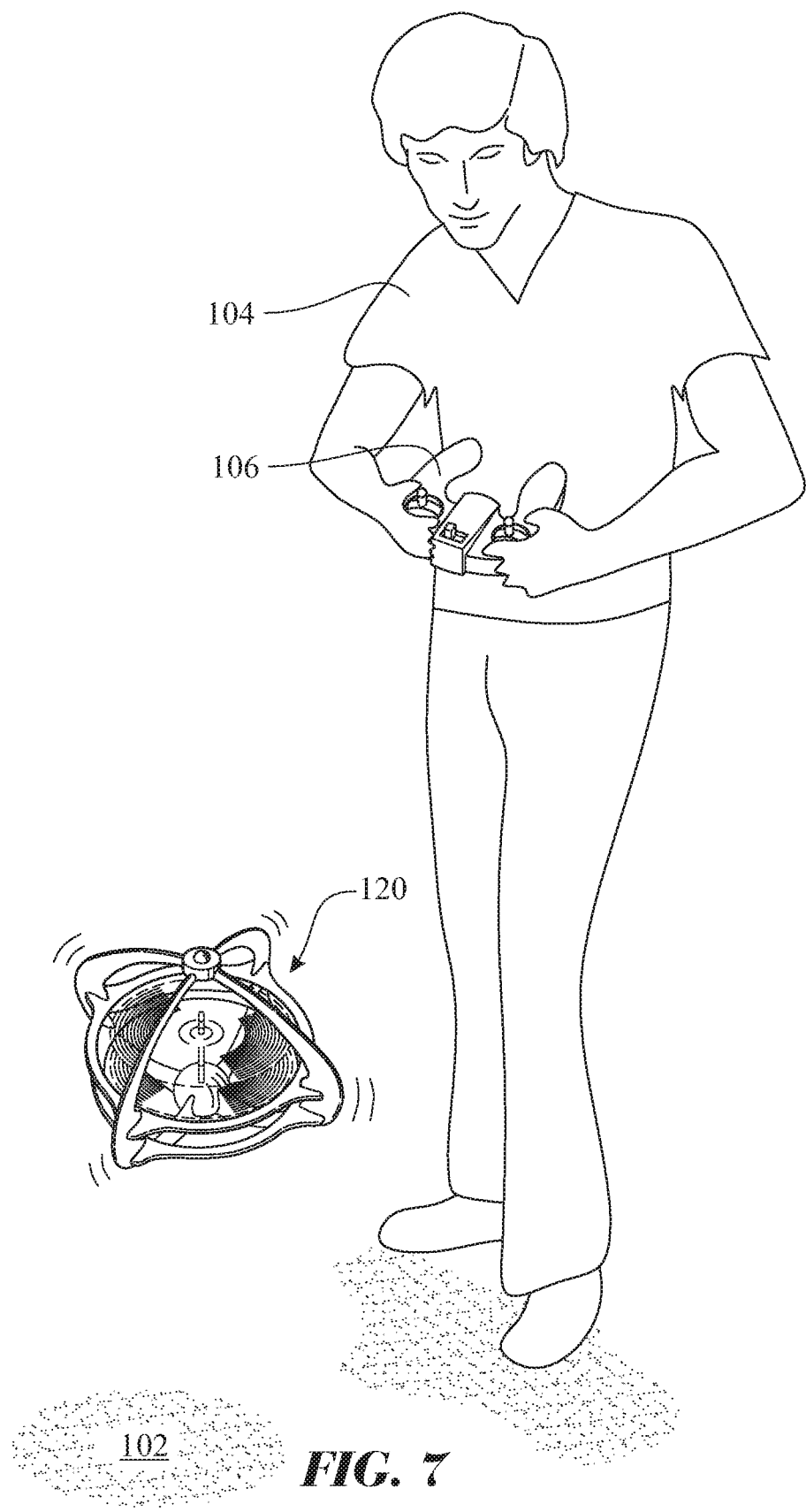
FIG. 7 presents a perspective view of a user remotely operating the aeronautical vehicle.
Figure 16:
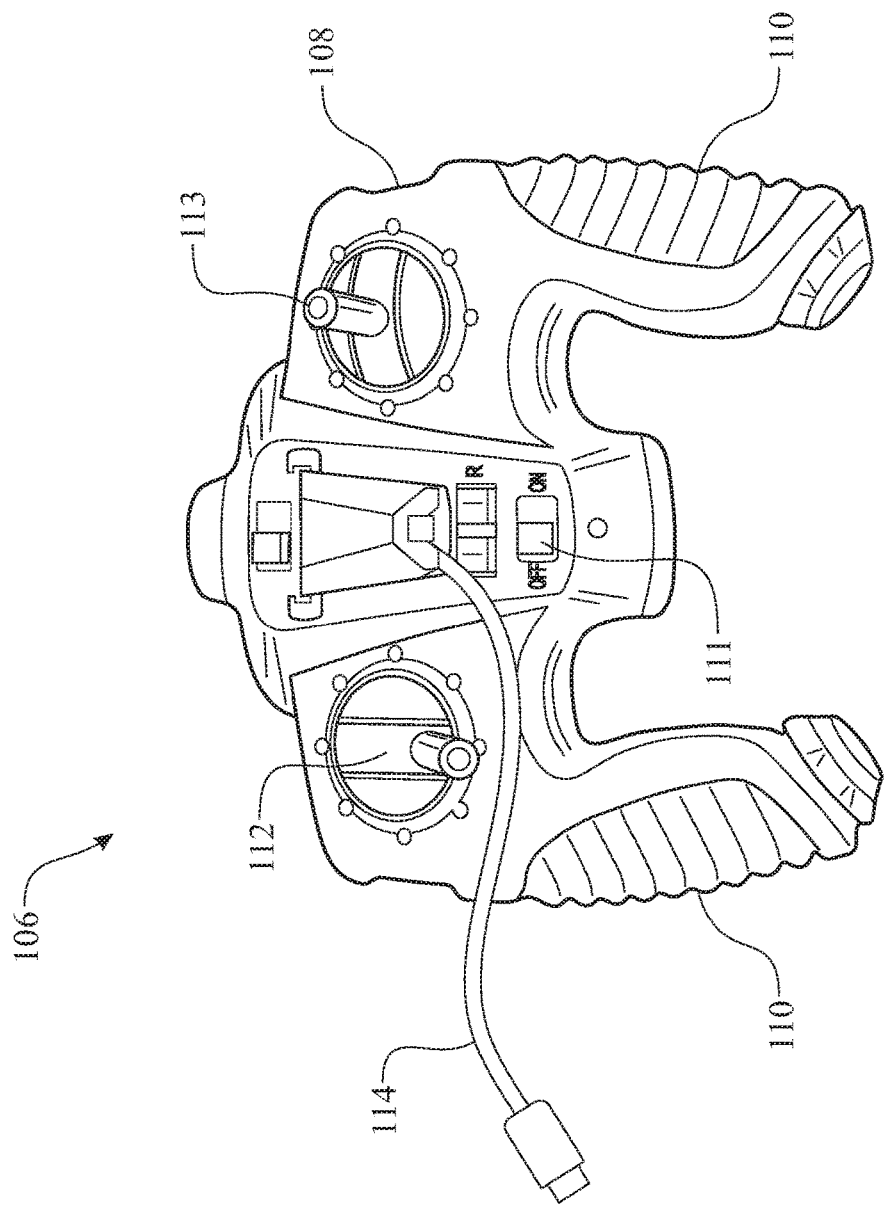
FIG. 16 presents a view of a representative remote control unit for use by a user for remotely controlling the aeronautical vehicle.

Referring now to FIGS. 7 and 16, flight operations of the model VTOL aeronautical vehicle 120 are shown wherein a user 104 utilizes a remote hand controller 106 to send control signals to aeronautical vehicle 120 to take off from and fly above surface 102. Remote hand controller 106, as further shown in FIG. 16, includes a case 108 formed to include handles 110 for grasping by user 104. Case 108 also houses the electronic circuitry (not shown) to generate and transmit the RF control signals for broadcast to aeronautical vehicle 120 to permit the remote controlled flight of vehicle 120. Controller 106 includes a power cord 114 for recharging batteries and various controls such as on-off switch 111 and joy sticks 112, 113 to generate the command signals for vertical and lateral translations of vehicle 120 thereby allowing user 104 to control vehicle 120 to take-off, perform flight maneuvers, and land.

During flight operations of a remotely controlled helicopter, one of the major problems occurs when the vehicle tips or lands in other than an upright orientation. In those instances, the user must travel to the location of the vehicle and re-orient the vehicle and then resume operations. The self-righting frame 140 of VTOL aeronautical vehicle 120 causes vehicle 120 to, in the event of other than an upright landing, re-orient itself without the aid of the user.

A worst case scenario of aeronautical vehicle 120 landing in an inverted orientation and its self-righting sequence is illustrated in FIGS. 8-15 and described herein. In FIG. 8, vehicle 120 has hypothetically landed in a worst case inverted orientation on surface 102 wherein aeronautical vehicle 120 is hypothetically resting on surface 102 at a single point of contact of spherical portion 160 of protrusion 158. Because of the spherical geometry of portion 160 or other geometry employed such that in an inverted orientation, there is only single point contact such as with a portion 160 being conical, protrusion 158 imparts an initial instability to frame assembly 140. Further, the initial instability is enhanced by weighted mass 154 positioning center of gravity 156 opposite most distant from the single point of contact of portion 160 of protrusion 158. The initial instability initiates a moment force "M" 189 to begin rotating vehicle 120 about the point of contact of portion 160.

Turning now to FIG. 9, vehicle 120 begins to seek a state of equilibrium from the initial state of instability described with respect to FIG. 8. Those practiced in the mechanical arts will readily recognize that such a state of equilibrium would occur when frame assembly contacts surface 102 at three points defining a contact plane with the weight vector 188 of vehicle 120 vertically projecting within the triangle on surface 102 defined by the three points of contact of frame assembly 140. As illustrated in FIG. 9, protrusion 158 with spherical portion 160 extends above the elliptical profile of frames 142 a dimensional distance of "Z" 193. As vehicle 120 tips to one side from protrusion 158 contact point 194, outer edge 144 of frames 142 contact surface 102 at frame contact points 195. The dimension "Z" 193 extension of protrusion 158 and portion 160 above frames 142 results in central axis 150 being angulated from vertical by angle "A" 190.

As illustrated, adjacent frames 142 each have a contact point 195 (in FIG. 9, a second frame 142 is hidden behind the illustrated frame 142) such that, as illustrated, a line interconnecting points 195 is orthogonal to the drawing page and forms one leg of a contact triangle defining a contact plane for vehicle 120. The line connecting points 195 is a distance "Y" 192 from contact point 194 of protrusion 158. If the lateral or horizontal displacement of weight vector 188 is such that vector 188 operates through the contact triangle defined by contact point 194 of protrusion 158 and the two contact points 195 of adjacent frames 142, an equilibrium state for vehicle 120 is found and it will remain in that state until disturbed into an unstable state. However, as illustrated in FIG. 9, height dimension "Z" is sufficiently large to create angle "A" such that weighted mass 154 and vehicle center of gravity 156 have been horizontally displaced from vertical by a distance "X" 191. Height dimension "Z" is selected to insure that dimension "X" 191 is greater than dimension "Y" 192.

Figure 10:
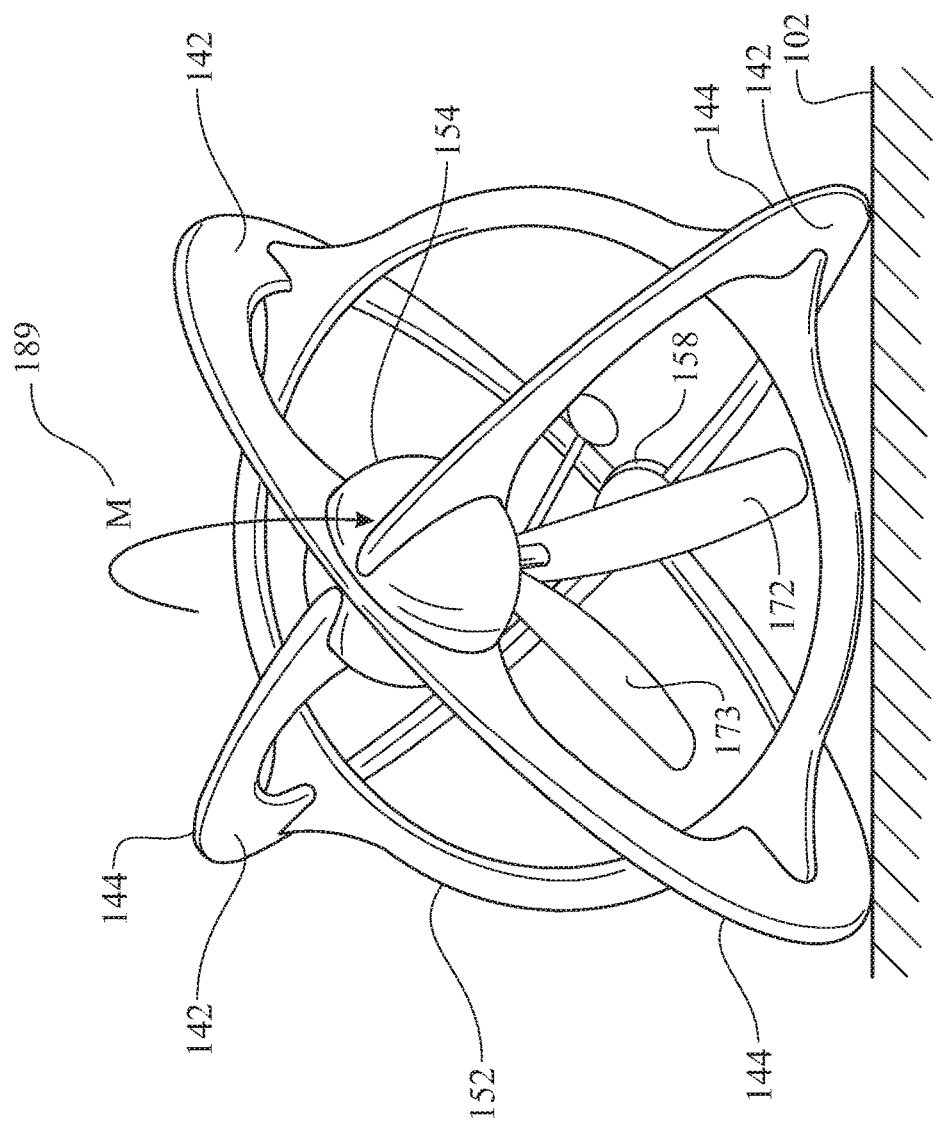
FIG. 10 presents an elevation view of the aeronautical vehicle resting on the surface and continuing the process of self-righting itself.
Figure 11:
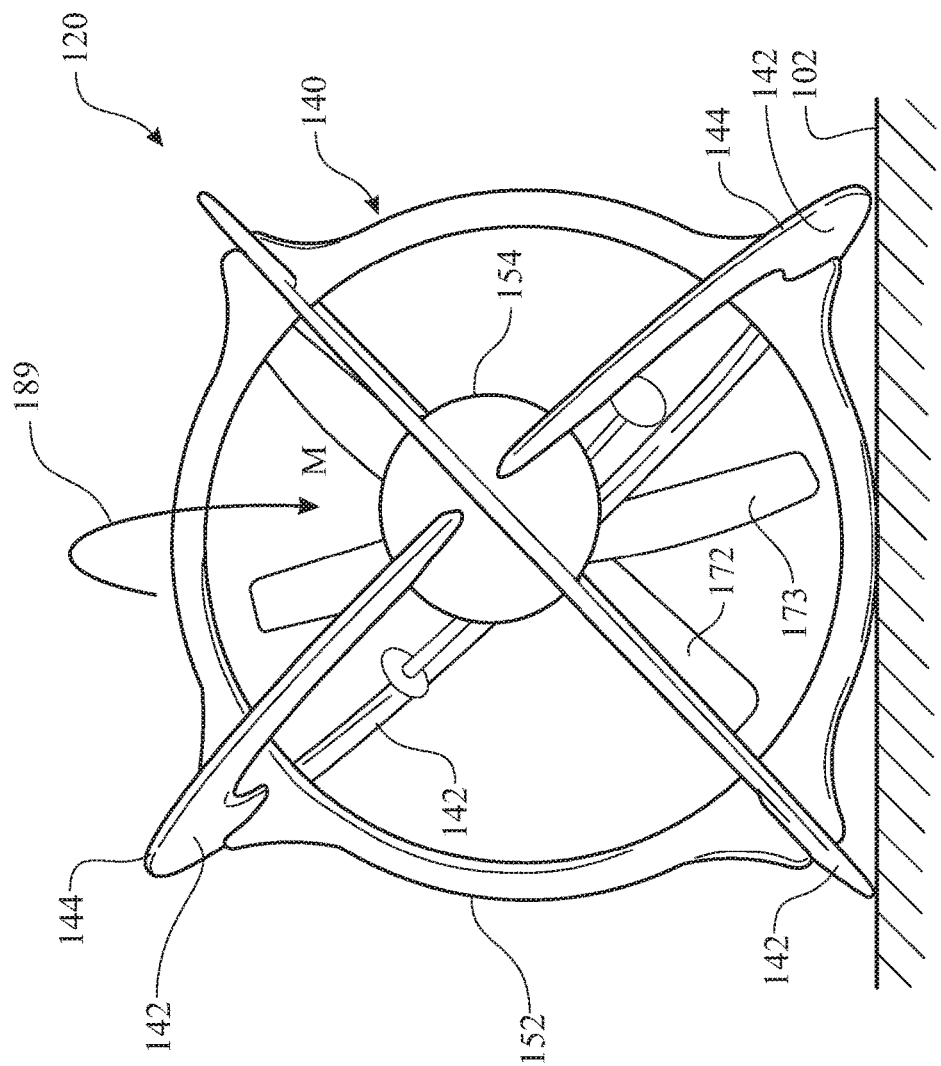
FIG. 11 presents an elevation view of the aeronautical vehicle resting on the surface and approximately one-half self-righted.

Turning now to FIG. 10, the vehicle of FIG. 9 is viewed as from the left side of FIG. 9 wherein weighted mass 154 being on the far side of the contact points 195 of FIG. 9 and creating righting moment "M" 189, vehicle 120 follows righting moment "M" 189 and continues its rotation to an upright position. Likewise, as illustrated in FIG. 11, weighted mass 154 approaches the ninety degree position of rotation from vertical. Those practiced in the art will readily recognize that an outer periphery of horizontal frame 152 in a preferred embodiment will not engage surface 102 as vehicle 120 or frame 140 rotates across surface 102. In this manner, the self-righting motion caused by moment "M" 189 will remain continuous and uninterrupted.

Figure 12:
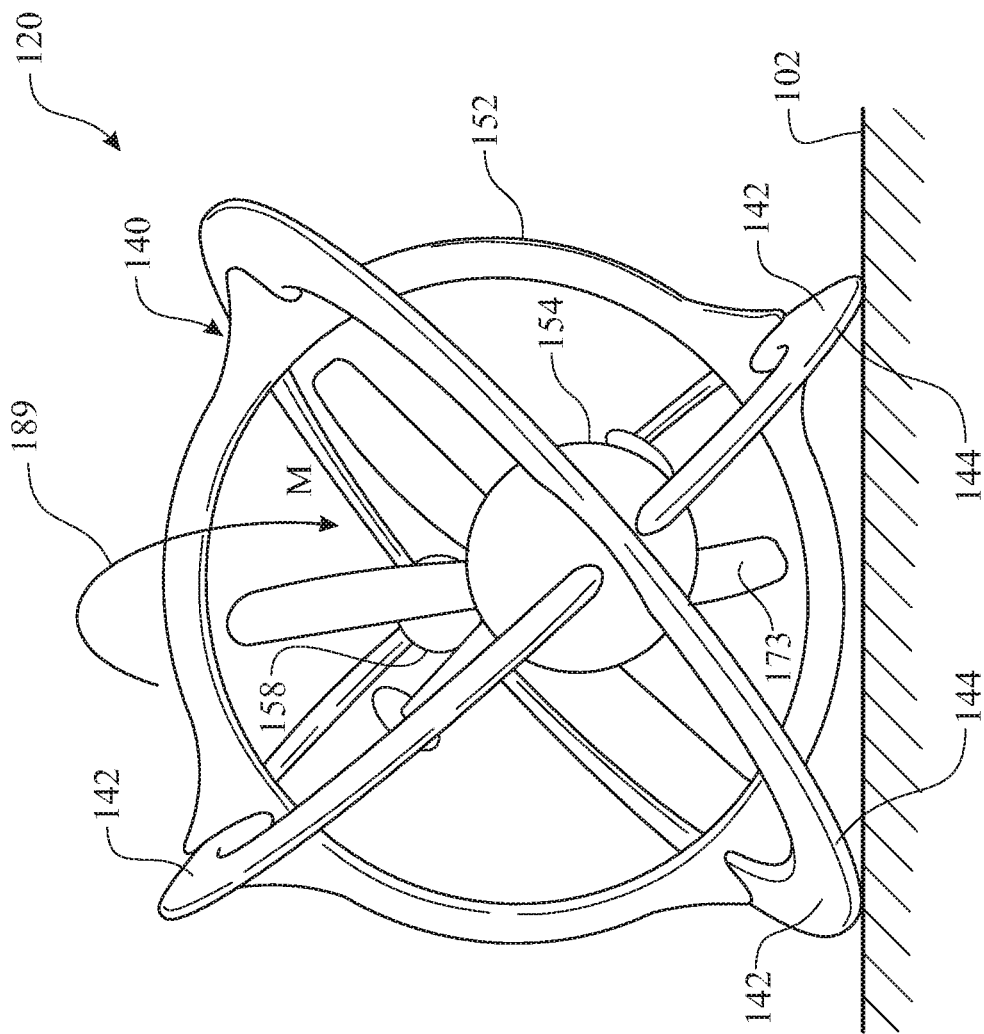
FIG. 12 presents an elevation view of the aeronautical vehicle resting on the surface and over one-half self-righted.
Figure 13:
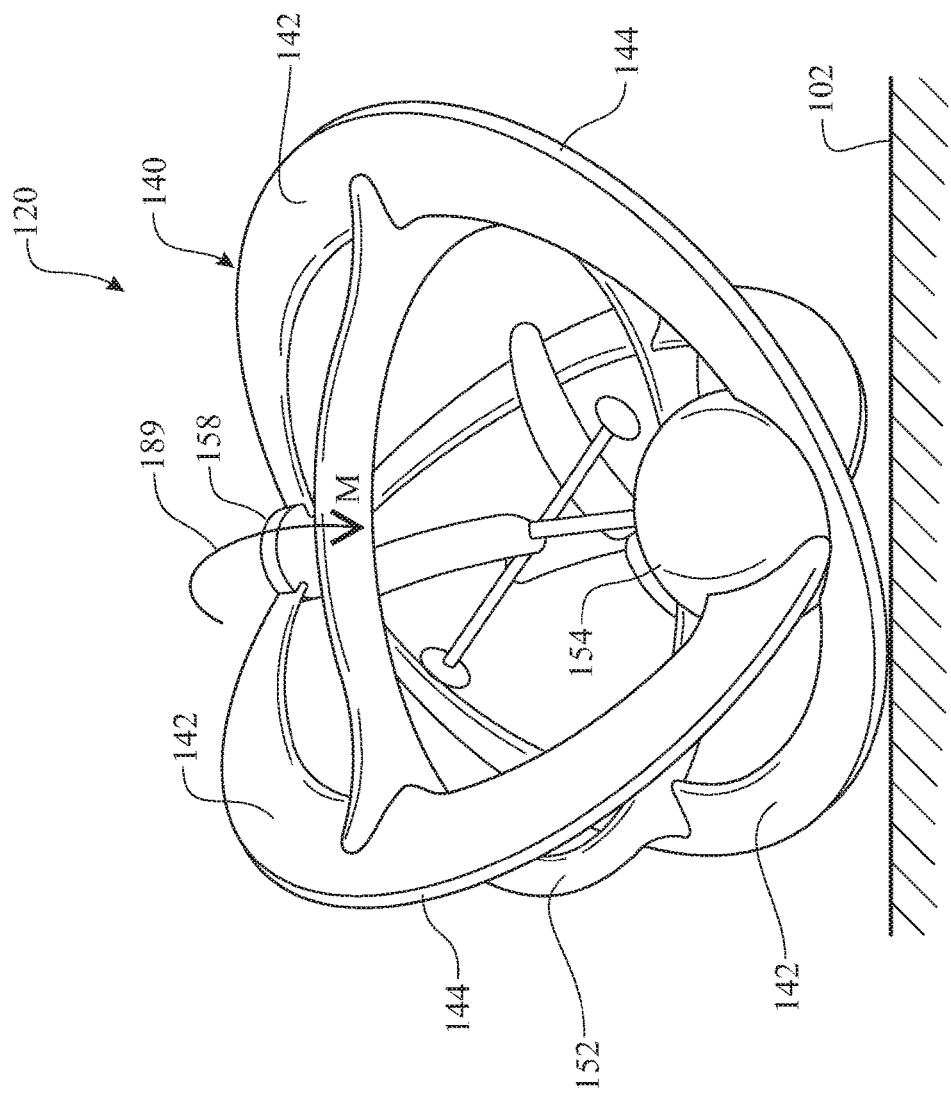
FIG. 13 presents an elevation view of the aeronautical vehicle resting on the surface and almost completely self-righted.
Figure 14:
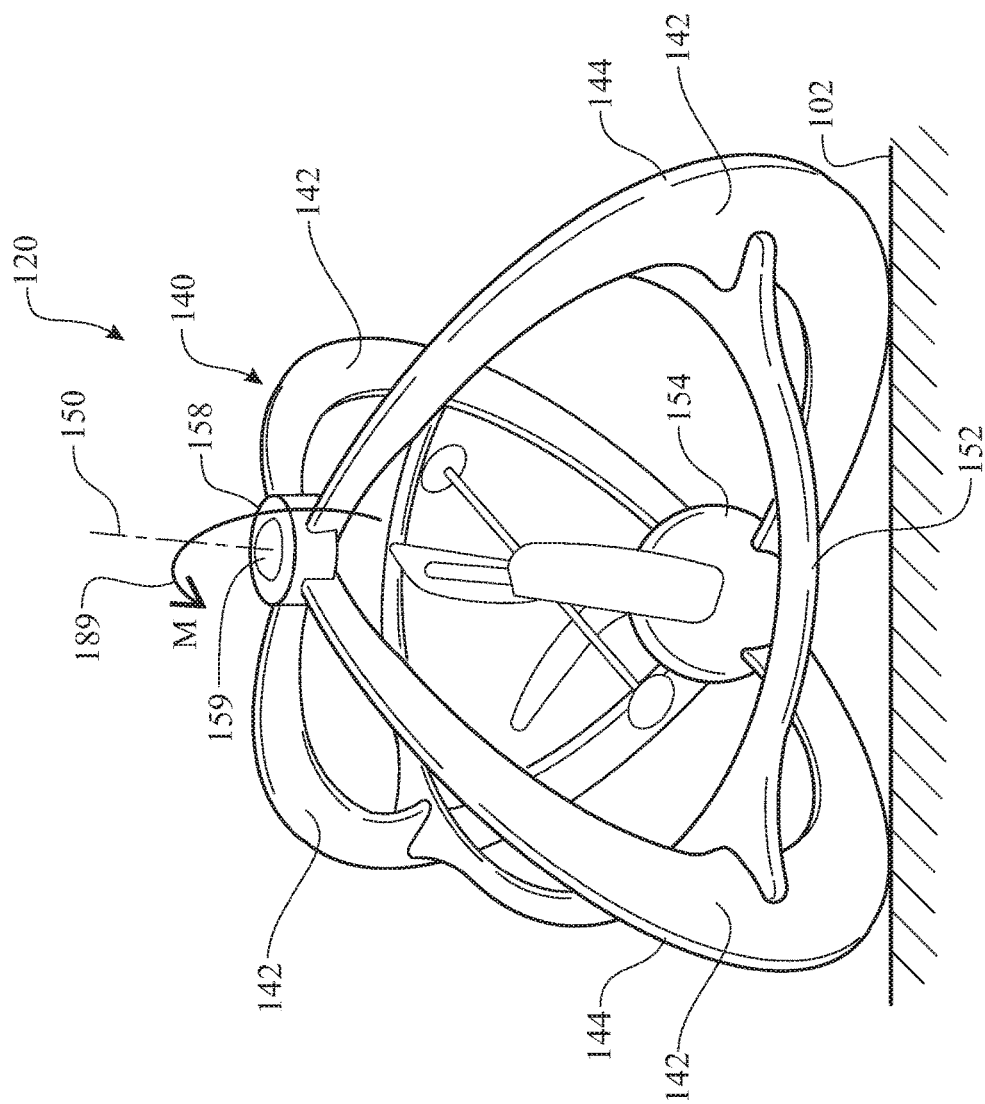
FIG. 14 presents an opposite elevation view of the aeronautical vehicle as shown in FIG. 13 and almost completely self-righted.

Referring now to FIGS. 12-14, vehicle 120 and frame 140 continue to rotate toward an upright position with weighted mass 154 consistently acting beyond the shifting points of contact of adjacent vertical frames 142. In FIG. 12, weighted mass 154 rotates downwardly from its ninety degree position and in FIGS. 13 and 14, weighted mass 154 approaches a position proximate to surface 102 wherein vehicle 120 is almost upright, FIG. 14 being a one hundred eighty degree opposing view of FIG. 13.

Figure 15:
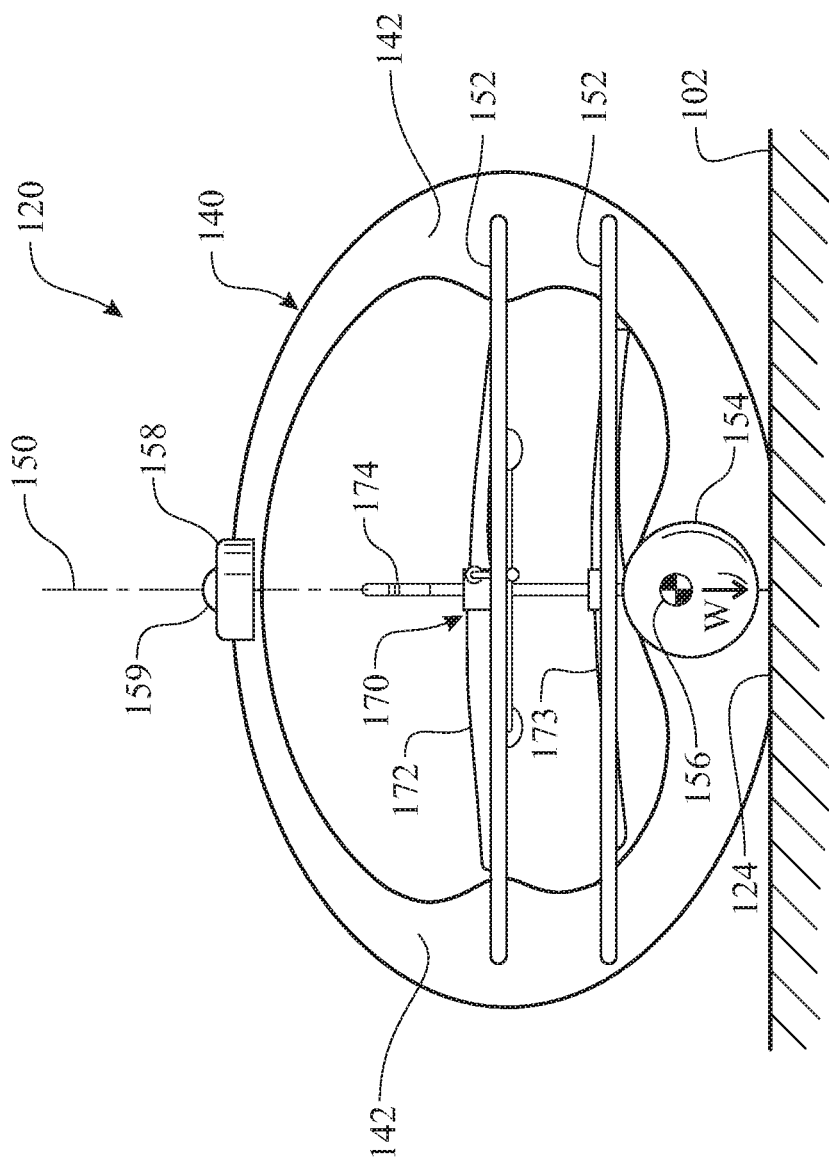
FIG. 15 presents an elevation view of the aeronautical vehicle at completion of the self-righting process.

In FIG. 15, vehicle 120 has achieved a stable upright equilibrium state wherein weighted mass 154 is most proximate to surface 102 and wherein flattened bottom 124 defines a resting plane on surface 102 to maintain upright stability of vehicle 120. Once aeronautical vehicle 120 has self-righted itself, vehicle 120 is once again ready to resume flight operations without requiring user 104 to walk or travel to the location of vehicle 120 to right it prior to resuming flight.

Those skilled in the art will recognize the design options for the quantity of vertical frames 142. Additionally, the same can be considered for the number of horizontal frames 152. The propulsion system can utilize a single rotor, a pair of counter-rotating rotors located along a common axis, multiple rotors located along either a common axis or separate axis, a jet pack, a rocket propulsion system, and the like.

Those skilled in the art will recognize the potential applications of the self-righting frame assembly for use in such items as a general vehicle, a construction device, a rolling support, a toy, a paperweight, and the like.

The self-righting structural frame 140 provides a structure allowing a body having a width that is greater than a height to naturally self-orient to a desired righted position. As the weight distribution increases towards the base of the self-righting structural frame 140, the more the frame 140 can be lowered and broadened without impacting the self-righting properties.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF. NO. DESCRIPTION 102 surface
104 user
106 remote hand controller
108 case
110 handles
111 on-off switch
112 joy sticks
113 joy sticks
114 power cord
120 remotely controlled aeronautical vehicle
122 top portion
124 flattened bottom
140 self-righting frame assembly
142 substantially identical vertically oriented frames
144 circular shaped outer curved edge
146 central void
148 inner edge
150 central vertical axis
152 horizontal frame
154 weighted mass
156 center of gravity
158 protrusion
159 spherical portion
170 maneuvering and lift mechanism
172 aerodynamic rotor
173 second aerodynamic rotor
174 mast
176 power supply
178 remote control electronics
180 stabilizer bar
181 weights
186 major axis (represented by dimension "a")
187 minor axis (represented by dimension "b")
188 weight vector
189 moment force "M"
190 angle "A"
191 dimension "X"
192 dimension "Y"
193 dimensional distance of "Z"
194 contact point
195 frame contact points

What is claimed is:

1. A method of righting a self-righting aeronautical vehicle, the method comprising steps of:
    obtaining the self-righting aeronautical vehicle, the self-righting aeronautical vehicle comprising:
        a structural frame, a portion of the structural frame having a convex outer circumferential exterior surface that is arched in shape, the structural frame having an interior surface defining a central void, and the structural frame comprising a bottom having a shape designed to support the structural frame in an upright orientation,
        a maneuvering and lift mechanism adapted to generate a lifting force, wherein the maneuvering and lift mechanism is in signal communication with control electronics, wherein the maneuvering and lift mechanism and the control electronics are supported the structural frame, and
        a weighted mass located at a position closer to the lower region of the structural frame than the upper region of the structural frame, thereby assisting self-righting of the self-righting aeronautical vehicle when the self-righting aeronautical vehicle is angled from a generally upright orientation;
    powering on the self-righting aeronautical vehicle;
    causing the self-righting aeronautical vehicle to rise to an airborne position using a lifting force generated by the maneuvering and lift mechanism;
    descending the self-righting aeronautical vehicle towards a generally horizontal surface, until the self-righting aeronautical vehicle contacts the generally horizontal surface;
    creating an instability when the self-righting aeronautical vehicle contacts the generally horizontal surface; and
    utilizing the shape of the structural frame and a location of the weighted mass to cause the maneuvering and lift mechanism to become right oriented when the structural frame contacts the generally horizontal surface at any angle, including an angle where the maneuvering and lift mechanism is at an orientation that is other than the generally upright oriented such that the maneuvering and lift mechanism returns to the generally upright orientation when the self-righting aeronautical vehicle comes to rest upon the generally horizontal surface.

2. A method of righting a self-righting aeronautical vehicle as recited in claim 1, wherein the arched shaped outer curved circumferential exterior surface is formed as a circular shaped outer curve, the method further comprising a step of:
utilizing a combination of the circular shaped outer curve of the structural frame and the location of the weighted mass to cause the self-righting aeronautical vehicle to aid in righting the maneuvering and lift mechanism when the self-righting aeronautical vehicle first contacts the generally horizontally oriented surface at any angle other than upright.

3. A method of righting a self-righting aeronautical vehicle as recited in claim 1, the method further comprising a step of:
utilizing a combination of the exterior surface shape of the structural frame and the location of the weighted mass to cause the self-righting aeronautical vehicle to right the orientation of the self-righting when the structural frame first contacts the generally horizontally oriented surface in an inverted orientation.

4. A method of righting a self-righting aeronautical vehicle as recited in claim 1, the method further comprising a step of:
utilizing a combination of the exterior surface shape of the structural frame and the location of the weighted mass to cause the self-righting aeronautical vehicle to right the orientation of the maneuvering and lift mechanism when the structural frame first contacts the generally horizontally oriented surface in an orientation between inverted and a right angle from inverted.

5. A method of righting a self-righting aeronautical vehicle as recited in claim 1, the structural frame further comprising at least one first oriented frame member, each at least one first oriented frame member being parallel to a horizontal plane when the self-righting aeronautical vehicle is resting on the generally horizontally oriented surface and at least one second oriented frame member, wherein each at least one second oriented frame member is oriented in a non-parallel relation to the horizontal plane, the method further comprising a step of:
utilizing a combination of the exterior surface shape of the structural frame and the location of the weighted mass to cause the self-righting aeronautical vehicle to right the orientation of the maneuvering and lift mechanism when the structural frame first contacts the generally horizontally oriented surface in an inverted orientation.

6. A method of righting a self-righting aeronautical vehicle as recited in claim 1, the structural frame further comprising at least one first oriented frame member, each at least one first oriented frame member being parallel to a horizontal plane when the self-righting aeronautical vehicle is resting on the generally horizontally oriented surface and at least one second oriented frame member, wherein each at least one second oriented frame member is oriented in a non-parallel relation to the horizontal plane, the method further comprising a step of:
utilizing a combination of the exterior surface shape of the structural frame and the location of the weighted mass to cause the self-righting aeronautical vehicle to right the orientation of the maneuvering and lift mechanism when the structural frame first contacts the generally horizontally oriented surface in an orientation including and between inverted and at any other angle offset from an upright orientation.

7. A method of righting a self-righting aeronautical vehicle as recited in claim 1, the structural frame further comprising a projection extending upward from a centrally located, upper position of the structural frame, the method further comprising a step of:
utilizing a combination of the projection of the structural frame, the exterior surface shape of the structural frame, and the location of the weighted mass to cause the self-righting aeronautical vehicle to right the orientation of the maneuvering and lift mechanism from a generally inverted position to the upright orientation when the projection of the structural frame first contacts the generally horizontally oriented surface.

8. A method of righting a self-righting aeronautical vehicle as recited in claim 1, the at least one maneuvering and lift mechanism adapted to generate a lifting force further comprising at least two aerodynamic rotors located within the central void of the structural frame, the method further comprising a step of:
rotating the at least two aerodynamic rotors to create lift and to maintain the rotational stability to the structural frame.

9. A method of righting a self-righting aeronautical vehicle as recited in claim 1, the at least one maneuvering and lift mechanism adapted to generate a lifting force further comprising a first aerodynamic rotor and a second aerodynamic rotor, wherein the first aerodynamic rotor and the second aerodynamic rotor are located within the central void of the structural frame, the method further comprising a step of:
rotating the first aerodynamic rotor and the second aerodynamic rotor in counter rotating directions to create lift and to maintain the rotational stability to the structural frame.

10. A method of righting a self-righting aeronautical vehicle as recited in claim 1, wherein the weighted mass and the maneuvering and lift mechanism are integral with one another,
wherein the step of utilizing the shape of the structural frame and a location of the weighted mass to cause the maneuvering and lift mechanism to become right oriented when the structural frame contacts the generally horizontal surface at any angle is accomplished using the integral weighted and maneuvering and lift mechanism combination.

11. A method of righting a self-righting aeronautical vehicle, the method comprising steps of:
obtaining the self-righting aeronautical vehicle, the self-righting aeronautical vehicle comprising:
a structural frame having a series of arched segments defining an exterior surface and a central void,
a maneuvering and lift mechanism adapted to generate a lifting force, wherein the maneuvering and lift mechanism is in signal communication with a control electronics, wherein the control electronics are supported by the structural frame, and
a weighted mass located at a position closer to the lower region of the structural frame than the upper region of the structural frame, thereby assisting self-righting of the self-righting aeronautical vehicle when the self-righting aeronautical vehicle is angled from a generally upright orientation;
powering on the self-righting aeronautical vehicle;
causing the self-righting aeronautical vehicle to rise to an airborne position using a lifting force generated by the maneuvering and lift mechanism;

descending the self-righting aeronautical vehicle towards a generally horizontal surface until the self-righting aeronautical vehicle contacts the generally horizontal surface;

causing an instability when the self-righting aeronautical vehicle contacts the generally horizontal surface; and utilizing a combination of the exterior surface of the structural frame and the location of the weighted mass to cause the maneuvering and lift mechanism to right itself when the structural frame contacts the generally horizontal surface at any angle other than the generally upright angle, such that the maneuvering and lift mechanism returns to the generally upright orientation when the self-righting aeronautical vehicle comes to rest upon the generally horizontal surface.

12. A method of righting a self-righting aeronautical vehicle as recited in claim 11, wherein the series of arched segments defining an exterior surface create a circular shaped outer curve, the method further comprising a step of:
   a combination of the circular shaped outer curve of the structural frame and the location of the weighted mass cause the self-righting aeronautical vehicle to right the maneuvering and lift mechanism when the structural frame first contacts the generally horizontally oriented surface at any angle other than upright.

13. A method of righting a self-righting aeronautical vehicle as recited in claim 11, wherein the series of arched segments form an arched exterior surface extending between an uppermost region of the structural frame and a bottom, where the bottom defines a resting surface when the self-righting aeronautical vehicle is at rest on the generally horizontally oriented surface, the method further comprising a step of:
   a combination of the arched exterior surface of the structural frame and the location of the weighted mass causing the self-righting aeronautical vehicle to right the maneuvering and lift mechanism when the structural frame first contacts the generally horizontally oriented surface at any angle other than upright.

14. A method of righting a self-righting aeronautical vehicle as recited in claim 11, wherein the structural frame is shaped having a height extending between a bottom surface and an outermost top surface of the upper region and a width extending horizontally between two outermost surfaces, wherein the height is smaller than the width, the method further comprising a step of:
   a combination of the structural frame and the location of the weighted mass causing the self-righting aeronautical vehicle to right the maneuvering and lift mechanism when the structural frame first contacts the generally horizontally oriented surface at any angle other than upright, while overcoming limitations of the shape where the height is smaller than the width.

15. A method of righting a self-righting aeronautical vehicle as recited in claim 11, the method further comprising a step of:
   a combination of the exterior surface shape of the structural frame and the location of the weighted mass causing the self-righting aeronautical vehicle to right the orientation of the maneuvering and lift mechanism when the structural frame first contacts the generally horizontally oriented surface in a inverted orientation.

16. A method of righting a self-righting aeronautical vehicle as recited in claim 11, the method further comprising a step of:
   a combination of the exterior surface shape of the structural frame and the location of the weighted mass causing the self-righting aeronautical vehicle to right the orientation of the maneuvering and lift mechanism when the structural frame first contacts the generally horizontally oriented surface in an orientation between inverted and a right angle from inverted.

17. A method of righting a self-righting aeronautical vehicle as recited in claim 11, the series of arched segments include at least one first oriented frame member, each at least one first oriented frame member being parallel to a horizontal plane when the self-righting aeronautical vehicle is resting on the generally horizontally oriented surface and at least one second oriented frame member, wherein each at least one second oriented frame member is oriented in a non-parallel relation to the horizontal plane, the method further comprising a step of:
   utilizing a combination of the exterior surface shape of the structural frame and the location of the weighted mass to cause the self-righting aeronautical vehicle to right the orientation of the self-righting aeronautical vehicle when the structural frame first contacts the generally horizontally oriented surface in an inverted orientation.

18. A method of righting a self-righting aeronautical vehicle as recited in claim 11, the series of arched segments include at least one first oriented frame member, each at least one first oriented frame member being parallel to a horizontal plane when the self-righting aeronautical vehicle is resting on the generally horizontally oriented surface and at least one second oriented frame member, wherein each at least one second oriented frame member is oriented in a non-parallel relation to the horizontal plane, the method further comprising a step of:
   utilizing a combination of the exterior surface shape of the structural frame and the location of the weighted mass to cause the self-righting aeronautical vehicle to right the orientation of the maneuvering and lift mechanism when the structural frame first contacts the generally horizontally oriented surface in an orientation including and between inverted and at any other angle offset from an upright orientation.

19. A method of righting a self-righting aeronautical vehicle as recited in claim 11, the structural frame further comprising a projection extending upward from a centrally located upper position of the structural frame, the method further comprising a step of:
   utilizing a combination of the projection of the structural frame, the exterior surface shape of the structural frame, and the location of the weighted mass to cause the self-righting aeronautical vehicle to right the orientation of the maneuvering and lift mechanism from a generally inverted position to the upright orientation when the projection of the structural frame first contacts the generally horizontally oriented surface.

20. A method of righting a self-righting aeronautical vehicle as recited in claim 11, the at least one maneuvering and lift mechanism adapted to generate a lifting force further comprising at least two aerodynamic rotors located within the central void of the structural frame, the method further comprising a step of:
   rotating the at least two aerodynamic rotors to create lift and to maintain the rotational stability to the structural frame.

21. A method of righting a self-righting aeronautical vehicle as recited in claim 11, the at least one maneuvering and lift mechanism adapted to generate a lifting force further comprising a first aerodynamic rotor and a second aerodynamic rotor, wherein the first aerodynamic rotor and the second aerodynamic rotor are located within the central void of the structural frame, the method further comprising a step of:

rotating the first aerodynamic rotor and the second aerodynamic rotor in counter rotating directions to create lift and to maintain the rotational stability to the structural frame.

22. A method of righting a self-righting aeronautical vehicle as recited in claim 11, wherein the weighted mass and the maneuvering and lift mechanism are integral with one another, wherein the step of utilizing the shape of the structural frame and a location of the weighted mass to cause the maneuvering and lift mechanism to become right oriented when the structural frame contacts the generally horizontal surface at any angle is accomplished using the integral weighted and maneuvering and lift mechanism combination.

* * * * *